(12) United States Patent
Laurent

(10) Patent No.: US 6,388,405 B2
(45) Date of Patent: May 14, 2002

(54) ELECTRONICALLY-COMMUTATED MOTOR

(75) Inventor: Jean-Marie Laurent, Montesson (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 09/760,603

(22) Filed: Jan. 17, 2001

(30) Foreign Application Priority Data

Jan. 18, 2000 (FR) .............................. 00 00589

(51) Int. Cl.$^7$ ........................... H02P 5/162; H02P 7/06
(52) U.S. Cl. ................... 318/254; 318/138; 318/439
(58) Field of Search ......................... 318/138, 254, 318/439, 599, 590, 596; 310/68 B

(56) References Cited

U.S. PATENT DOCUMENTS

| | | | |
|---|---|---|---|
| 5,283,510 A | * 2/1994 | Tamaki et al. | 310/51 |
| 5,457,374 A | 10/1995 | Branecky et al. | 318/801 |
| 5,463,300 A | 10/1995 | Oximberg | 318/801 |
| 5,808,440 A | * 9/1998 | Bennett et al. | 318/139 |
| 6,137,247 A | * 10/2000 | Maehara et al. | 318/140 |
| 6,163,119 A | * 12/2000 | Jeong | 318/138 |

* cited by examiner

*Primary Examiner*—Burton S. Mullins
(74) *Attorney, Agent, or Firm*—Larson & Taylor, PLC

(57) ABSTRACT

The motor has a stator and a rotor. One of the elements has coils constituting a three-phase winding and an electronic control module having inputs connected to rotor position sensors and to a speed reference signal ($V_c$), and including a power circuit for powering the phases from a DC source under the control of a processor. The processor causes the phases to be powered at variable duty ratio so as to regulate speed in a first mode without overlap in time between the periods in which the various phases are powered with voltage pulses, and in a second mode in which there is 33% overlap of power to two phases, and it causes a changeover from the first mode to the second mode when the duty ratio reaches a predetermined value lying in the range 70% to 100%, and a changeover from the second mode to the first mode when the duty ratio falls below another predetermined value.

6 Claims, 2 Drawing Sheets

1 ELECTRIC TURN

ELECTRONICALLY-COMMUTATED MOTOR

BACKGROUND OF THE INVENTION

The present invention relates to electronically-commutated motors, also known as "brushless" motors, for applications that require both acceptable efficiency and low cost. A major, although not exclusive, application lies in the automobile industry for driving the feed pumps for servomotors or actuators with hydraulic liquid under pressure at a flow rate that is highly variable.

Electronically-commutated motors comprise a stator-and-rotor assembly in which one of the elements (generally the stator) has coils generally constituting a three-phase winding and an electronic control module having inputs connected to rotor position sensors (generally Hall sensors) and to a speed reference signal, and including a power circuit for powering the phases from a DC source under the control of a processor.

In general, for reasons of efficiency, the processor is designed to power the phases in a so-called "120°" mode. In this case, the module feeds two phases of a three-phase motor in turns with periodic voltage pulses having a variable duty ratio to regulate speed by pulse width modulation (PWM) and without any overlap between the on periods of the various phases. However, that power supply mode suffers from the drawback of presenting a speed/torque characteristic that is insufficient at high speed, that adapts poorly to operating conditions under certain conditions (e.g. powering a power steering actuator when steering the wheels hard at low speed or while stationary).

A so-called "180°" mode of regulation is also known which gives rise to all three phases being fed with pulses simultaneously. However that mode of control presents poor efficiency when the motor is lightly loaded, particularly because of the presence of a large reactive component which increases losses due to the Joule effect.

SUMMARY OF THE INVENTION

An object of the present invention seeks in particular to provide a motor that satisfies practical requirements better than previously known motors, particularly in that it makes it possible simultaneously to obtain good efficiency under low loading and large torque at high speed. To this end, the invention provides an electronically-commutated motor whose processor is designed to feed its phases at a variable duty ratio in order to provide speed regulation, both in a first mode without time overlap between the periods during which the various phases are fed with pulses of electricity, and in a second mode with 33% overlap between feeds to two phases, with changeover from the first mode to the second mode being undertaken when the duty ratio reaches a predetermined value lying in the range 70% to 100%, and with changeover from the second mode to the first mode being performed when the duty ratio drops below another predetermined value. This other value is selected so as to avoid a "hunting" phenomenon by creating hysteresis.

To ensure that changeover from the first mode to the second mode takes place smoothly, the duty ratio is changed during this changeover by looking up a new duty ratio in a stored table. Regulation is generally of the proportional integral (PI) type. Changeover from one mode to the other is then advantageously accompanied by modifying the integral term on the basis of a value looked up in a speed correspondence table.

The above characteristics and others will appear better on reading the following description of a particular embodiment given by way of non-limiting example.

DETAILED DESCRIPTION

Figure 1:
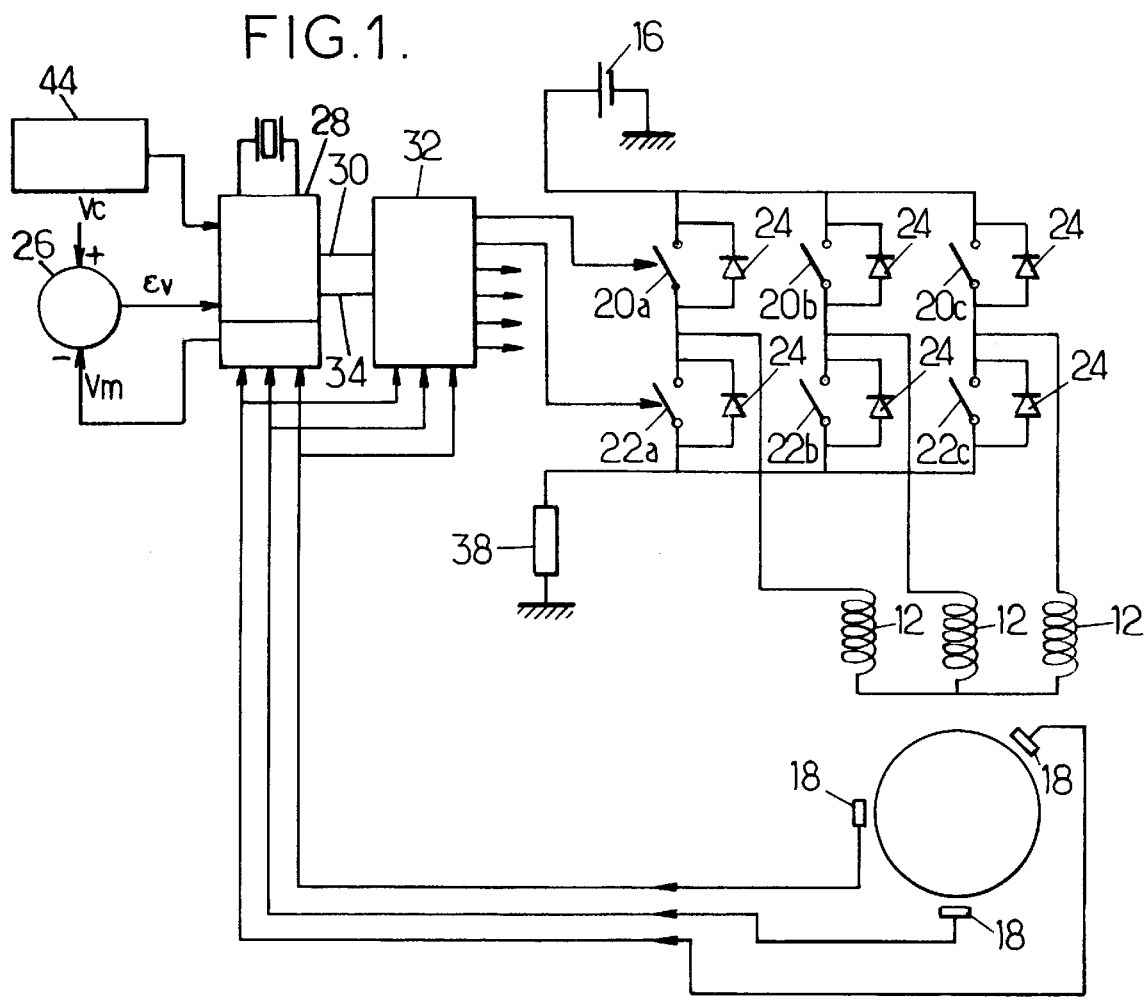
FIG. 1 is a circuit diagram of a motor of the invention.

The motor whose electrical circuit is shown in FIG. 1 comprises an assembly of conventional structure having a permanent magnet rotor 10 and a stator carrying three coils 12 (or three sets of coils) together with rotor position sensors 18. The control module serves to feed the coils from a DC source 16. This module is advantageously mounted directly on the stator. It has three branches for feeding the respective coils 12. Both ends of each branch are connected to one of the terminals of the DC source 16 and each branch comprises two switches 20 and 22 connected in series. Each switch is in parallel with an element 24 that conducts in one direction only. The switches are generally constituted by MOS transistors and the elements 24 by solid state diodes.

The coils shown in FIG. 1 are star connected. Each of them is powered from the midpoint of one of the branches. A delta configuration would also be possible.

The circuit shown has its speed regulated in digital manner. It includes a subtracter 26 which has one input receiving a numerical signal $V_c$ indicating the reference value for the speed and another input receiving a digital signal $V_m$ which is representative of the speed of the rotor. This signal $V_m$ can be provided by a special sensor. More often, it is generated by a processor 28 which receives the output signals from the position sensors 18.

The processor 28 is designed to deliver a digital signal on its output 30 that is representative of the duty ratio $\tau/t$ (or PWM) of the periodic voltage pulses delivered to the coils during successive periods each of duration T. This signal is generated on the basis of an error signal $\epsilon v$ supplied by the subtracter 26. The circuit 32 for controlling the power switches 20 and 22 generates switch closure signals on the basis of the value of the duty ratio PWM, on the basis of the signals delivered by the sensors 18 giving the position of the rotor, and on the basis of a frequency control and synchronizing signal 34. For electric motors having a maximum speed that does not exceed a few thousand revolutions per minute, a pulse frequency of 5 kHz to 20 kHz generally gives good results.

Figure 2:
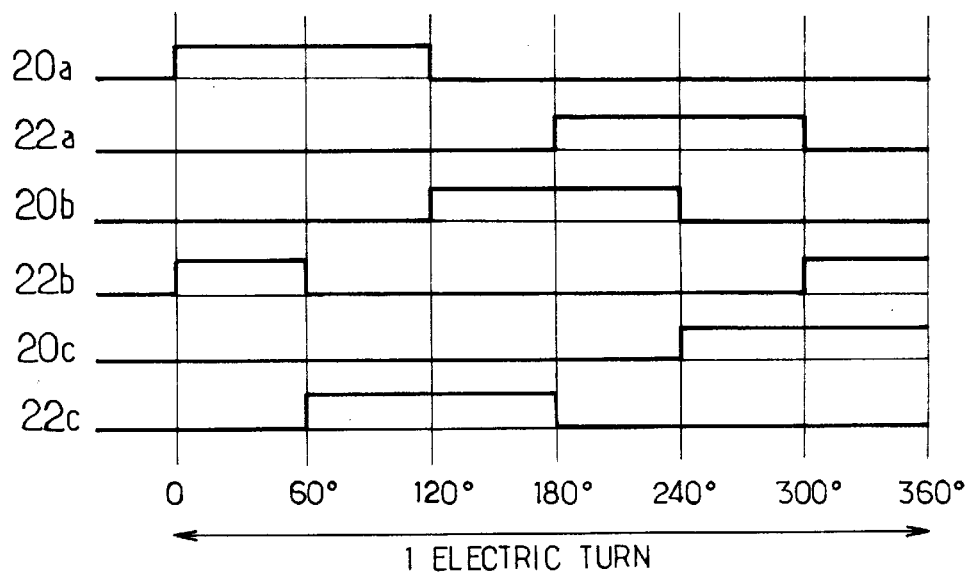
FIGS. 2 and 3 are timing diagrams showing the feed periods of the various phases in 120° mode and in 180° mode, respectively.
Figure 4:
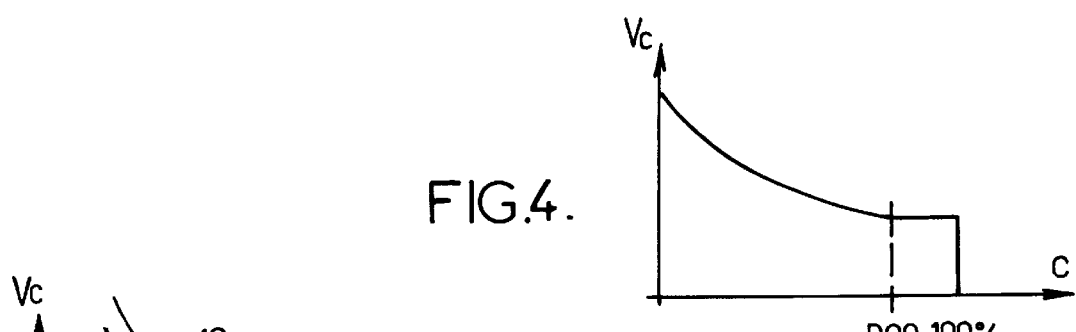
FIGS. 4 and 5 show the appearance of the torque/voltage characteristics in 120° mode and in 180° mode, and also the transition form one to the other.

FIG. 2 shows the succession of periods T during which the switches 20 and 22 are closed in 120° mode. Each of the lines carries a reference corresponding to the reference given to the corresponding switch in FIG. 1. The "120°" mode of FIG. 2 has the advantage of giving high efficiency. However the speed/torque characteristic of the motor when operating in this mode is of the kind shown in FIG. 4. High torque can be obtained only at low speed. Once a duty ratio of 100% is achieved, any further increase in torque can be obtained only by increasing current and current must itself be limited to a value that is compatible with the rating of the windings, corresponding to the right-hand limit of the curve in FIG. 4. Current can be measured on the basis of the voltage across the terminals of a resistor 38 in the ground return circuit.

Figure 3:
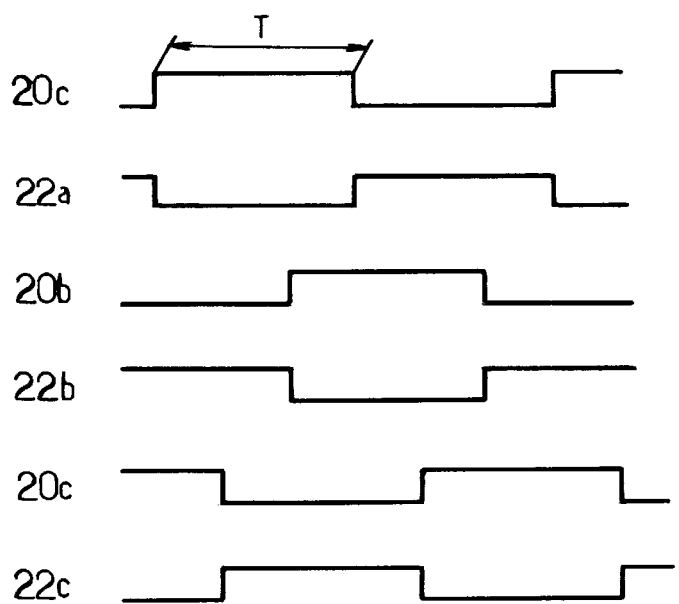
Figure 5:
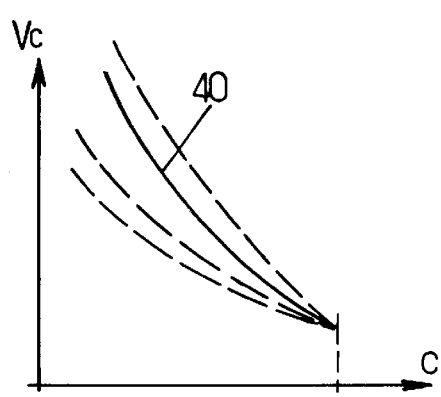

The 180° mode of operating the motor takes place with the switches being closed in the timing configuration shown in FIG. 3. Curve 40 in FIG. 5 gives an example of the operating characteristic in this mode. As explained below, the servo-control used is of the proportional-integral type. There therefore exists a family of characteristics as represented by dashed lines in FIG. 5 corresponding to different values of the duty ratio (or PWM).

Figure 6:
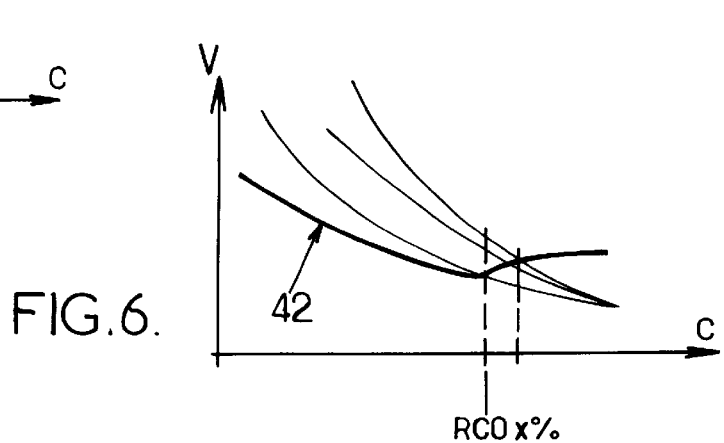
FIG. 6 shows the effect of changing over from one mode to the other.

In a particular embodiment of the invention, the processor 28 is designed to cause operation to begin in 120° mode and to change the control circuit 32 over from 120° mode to 180° mode. It is thus possible to obtain a characteristic of the kind shown at 42 in FIG. 6.

To obtain a smooth transition from one mode to the other, it is appropriate to cause the control circuit to switch from the initial characteristic in 120° mode to a characteristic in 180° mode that is close thereto for the same value of torque. This means that the duty ratio (or PWM) must be changed, e.g. by looking up in a stored correspondence table. With proportional-integral type regulation, this result can be obtained or contributed to by changing the integral term as a function of speed, likewise on the basis of a lookup table stored in a memory 44.

If the speed error for digital sample n is written $\epsilon n$, then it is possible to use an integral term int(n) having the form:

$$int(n)=int(n-1)+\epsilon n.k_i$$

where $k_i$ is the coefficient of the integral term.

The duty ratio PWM(n) is then given by:

$$PWM(n)=Kp.\epsilon n+int(n)$$

When changing over to 180° mode, the term int(n+1) that would be supplied by the above equations is replaced by another term int(n+1) which is a function of the speed and the PWM stored in the memory 44.

To facilitate the transition, changing over to 180° mode advantageously takes place on a rising or falling front in the periods T, merely by delaying the changeover.

The processor 28 is designed to cause the control circuit to return to 120° at a new duty ratio value which is selected so as to avoid any risk of hunting, i.e. of alternating rapidly between the two modes; the duty ratio (or PWM) is again modified during changeover by using the table in the memory 44.

All of the calculation and control functions can easily be implemented by a microcontroller of very simple type, easily installed in the case of the motor.

What is claimed is:

1. A brushless motor comprising:
   an assembly of a stator and a rotor which has coils constituting a three-phase winding and
   an electronic control module having inputs connected to rotor position sensors and to an input receiving a speed reference signal, and including a power circuit for powering the phases from a DC source under the control of a processor, wherein said processor is arranged:
   for powering the phases at a variable duty ratio to regulate speed in a first mode without time overlap between periods during which the phases are fed with current pulses, and in a second mode in which power supplies to two phases have an overlap of 33%; and
   for causing a changeover from the first mode to the second mode when the duty ratio reaches a first predetermined value lying in the range 70% to 100%, and a changeover from the second mode to the first mode when the duty ratio drops below another predetermined value.

2. A motor according to claim 1, wherein said processor is arranged to modify the duty ratio of the voltage pulses on changing over from the first mode to the second and from the second to the first mode by using a stored table.

3. A motor according to claim 1, wherein the processor is arranged to perform proportional-integral type regulation and an integral term of the regulation is modified responsive to changeover.

4. A motor according to claim 3, wherein the processor implements regulation with an integral term int(n) for a sample n of the form:

$$int(n)=int(n-1)+\epsilon n.k_i$$

where $k_i$ is a coefficient of the integral term, and the duty ratio PWM(n) for sample n is given by:

$$PWM(n)=Kp.\epsilon n+int(n)$$

and is arranged so that on changeover, the term int(n+1) is replaced by another term int(n+1) which is a function of the speed and the PWM stored in the memory (44).

5. A motor according to claim 1, wherein the processor is arranged to cause changeover from one mode to another to take place on a rising or falling front of the periods during which all three phases are fed without overlap.

6. A motor according to claim 1, wherein the processor is arranged to cause operation to take place initially in the first mode which is a 120° mode and to cause the control circuit to change over from the 120° mode to the second mode which is a 180° mode when the duty ratio reaches the first predetermined value.

* * * * *